(12) United States Patent
Trigg

(10) Patent No.: US 6,433,325 B1
(45) Date of Patent: Aug. 13, 2002

(54) APPARATUS AND METHOD FOR IMAGE ENHANCEMENT

(75) Inventor: Alastair David Trigg, Buona Lodge (SG)

(73) Assignee: Institute of Microelectronics, Singapore (SG)

( * ) Notice: Subject to any disclaimer, the term of this patent is extended or adjusted under 35 U.S.C. 154(b) by 0 days.

(21) Appl. No.: 09/420,751

(22) Filed: Oct. 20, 1999

(30) Foreign Application Priority Data

Aug. 7, 1999 (SG) .......................................... 9903821-8

(51) Int. Cl.7 .......................... G02B 27/40; H01L 25/00
(52) U.S. Cl. ...................... 250/201.3; 250/332; 348/79; 359/368; 382/106; 382/255
(58) Field of Search .......................... 250/201.1, 201.2, 250/201.3, 208.1, 330, 332; 348/73, 79, 80, 345, 349, 354, 356, 357; 359/368, 370, 371, 379, 380, 381, 382; 382/106, 128, 130, 154, 255, 263, 254

(56) References Cited

U.S. PATENT DOCUMENTS

| | | | | |
|---|---|---|---|---|
| 4,584,704 A | * | 4/1986 | Ferren | 348/356 |
| 5,572,359 A | * | 11/1996 | Otaki et al. | 359/371 |
| 5,975,702 A | * | 11/1999 | Pugh et al. | 351/232 |
| 6,121,616 A | * | 9/2000 | Trigg | 250/332 |
| 6,201,899 B1 | * | 3/2001 | Bergen | 382/106 |
| 6,215,586 B1 | * | 4/2001 | Clark | 348/73 |
| 6,320,979 B1 | * | 11/2001 | Melen | 382/154 |

* cited by examiner

Primary Examiner—Stephone Allen
(74) Attorney, Agent, or Firm—Blakely, Sokoloff, Taylor & Zafman

(57) ABSTRACT

An image enhancement technique for use, for example in infrared or photoemission microscopy, comprises obtaining an in-focus image of the sample and an out of focus image achieved by relative movement of the sample and the microscope, and subtracting the out of focus image from the in-focus image. As a result the low frequency components are subtracted out, together with the lens and focal plane array aberrations, providing an enhanced resultant image. Because of the high levels of magnification, only small movement is required to obtain the out of focus image, allowing an enhanced image to be obtained in real time.

20 Claims, 9 Drawing Sheets

APPARATUS AND METHOD FOR IMAGE ENHANCEMENT

BACKGROUND OF THE INVENTION

1. Field of the Invention

The invention relates to an apparatus and method for image enhancement for example in infrared (IR) and photoemission microscopes.

2. Description of the Related Art

A typical infrared/photoemission microscope is shown schematically in FIG. 1 and comprises a sample stage 10, a sample 12 to be images, an objective lens 14 and a focal plane array 16 on which the image of the sample is formed. Focal plane arrays are solid state detectors comprising arrays of detecting elements typically up to 1000×1000. Each of these corresponds to a single pixel. Variations in the performance of these elements relative to each other give rise to pixel to pixel variations described in more detail below. In infrared microscopy the. infrared emissions from the sample are focused on the focal plane array which provides the image of the sample. Photoemission microscopy is based on the phenomenon that certain samples, such as integrated circuits emit electromagnetic radiation when excited which can be focused, and detected to provide an image of the sample. A known microscope of this type is described in U.S. Pat. No. 6,121,616, which is incorporated herein by reference.

A problem exists with images obtained from microscopes such as infrared or photoemission microscopes in the infrared, which frequently contain undesirable artefacts. These arise for various reasons. These reasons include imperfections in the infrared focal plane array on which the image is formed, for example imaging devices such as a charge coupled device (CCD) or image intensifier giving rise to pixel to pixel variation. In addition aberrations in the lenses cause problems, especially as those aberrations can be worse than, or different from those found in the visible part of the spectrum where the lenses are operating outside their optimum or tested wavelength range. Poor illumination of the sample can reduce the image quality and in the case of backside imaging so can poor contrast due to reflections from the back surface and out of focus features on the back surface.

Known image enhancement systems addressing at least some of these problems include use of a flat field image, widely used in astronomy, and use of an "unsharp mask" a photographic technique.

The flat field image technique is used to ameliorate pixel to pixel variations in gain in a sample image at the focal plane array. The flat field image is obtained using the same imaging device, to image a uniform grey subject which can be taken from a library of such subjects. The sample image is multiplied by the reciprocal of the flat field image using known techniques cancelling out the pixel variations in the imaging device.

Various problems exist with this technique. The characteristics of the focal plane array may vary with light intensity, wavelength or time such that the flat field image does not represent identical pixel variations. In addition the other factors reducing image quality, as set out above, are not compensated. As can be seen from FIGS. 2a and 2b, whilst the corrected image shown in FIG. 2b compensates for pixel variations, the poor illumination of the sample is not corrected. The poor contrast and edge definition, arising from operation of the lens outside its optimum range and the fact that the image is obtained through several hundred micrometers of silicon, also remain uncorrected.

The "unsharp mask" technique relies on creation of an out-of-focus, blurred or "unsharp" image from the sample image. As a result the high frequency components of the sample image are removed in the unsharp image. The unsharp image is then subtracted from the photographic image, removing the low frequency components and hence improving sharpness. Various techniques are available to create the unsharp image and subtract it from the sample image, for example using photographic processing at the enlarging stage (rather than when the photograph is taken) or image processing software as will be known to the skilled person and are set out in U.S. Pat. No. 5,001,573, to Sakamoto et al. which is incorporated herein by reference.

A problem with the unsharp mask technique is that the unsharp image is simply the original image that has been defocused using a convolution function, limiting the amount of image information available and in particular meaning that there is no correction of various of the factors listed above such as pixel variation.

It is an object of the invention to mitigate problems associated with known image enhancement techniques.

According to the invention there is provided an apparatus and method as set out in the appended claims.

BRIEF DESCRIPTION OF THE DRAWINGS

Embodiments of the invention will now be described, by way of example with reference to the drawings of which.

Throughout the figures like reference numerals designate like parts.

DETAILED DESCRIPTION

Figure 1:
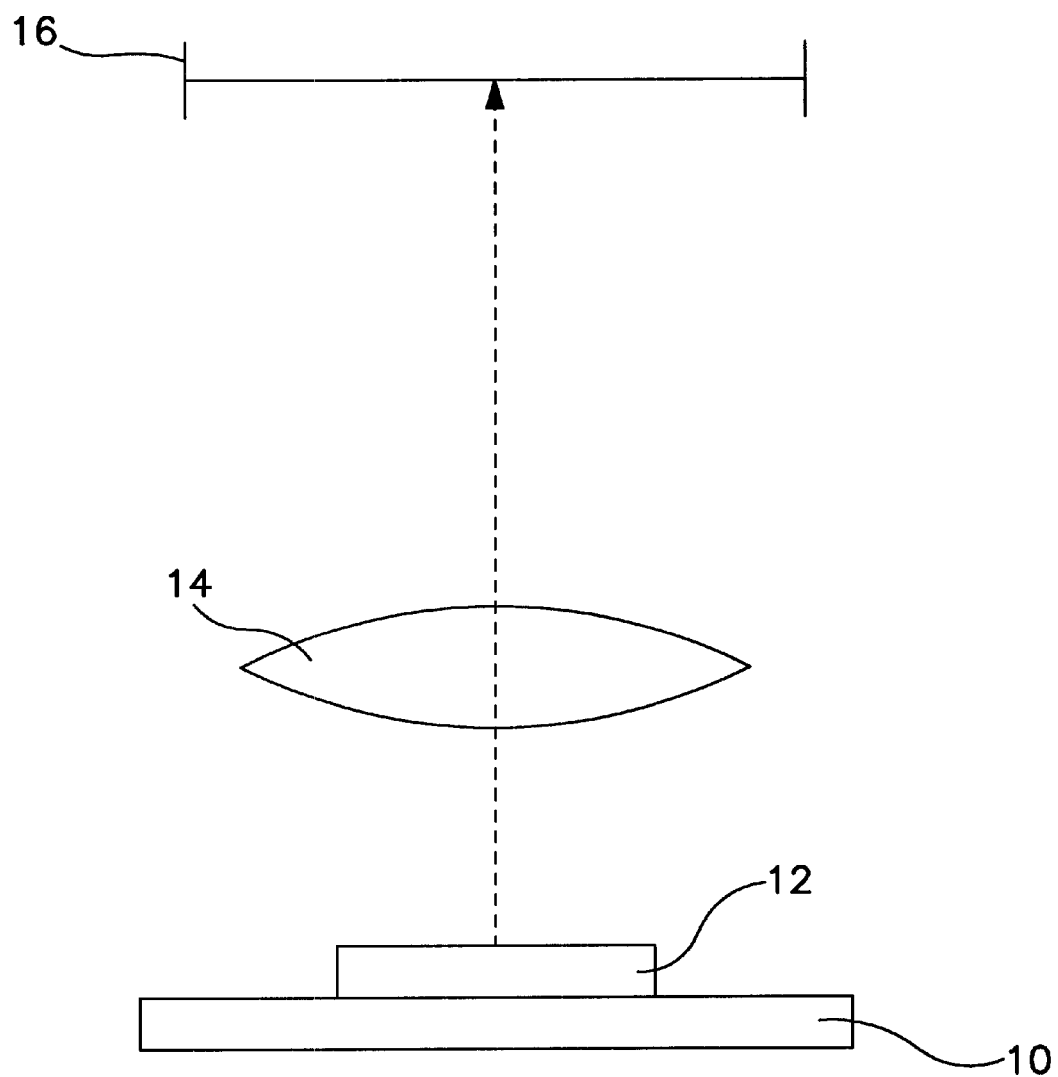
FIG. 1 is a schematic view showing an infrared/photoemission microscope of known type.
Figure 2A:
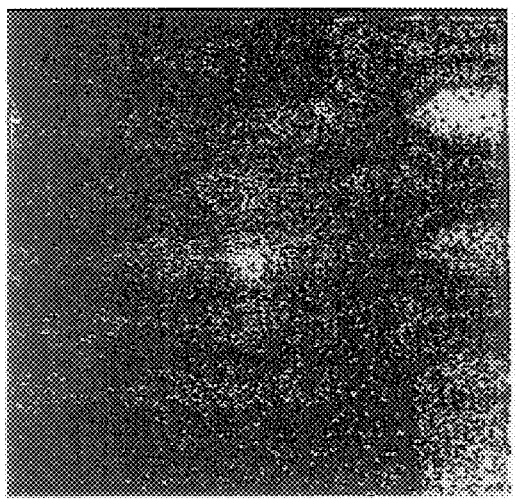
FIG. 2a shows a sample image at a focal plane array of a microscope.
Figure 2B:
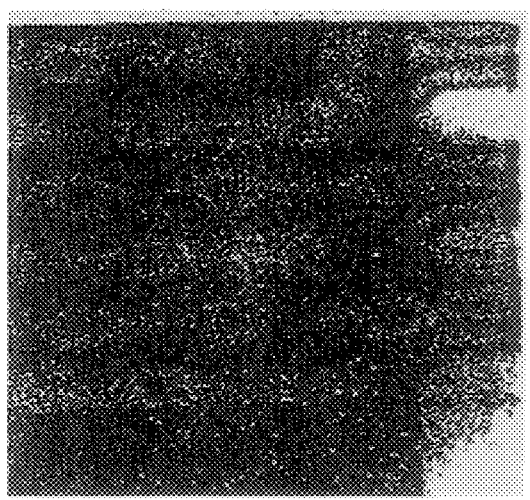
FIG. 2b shows an enhanced image achieved using a known technique.
Figure 3A:
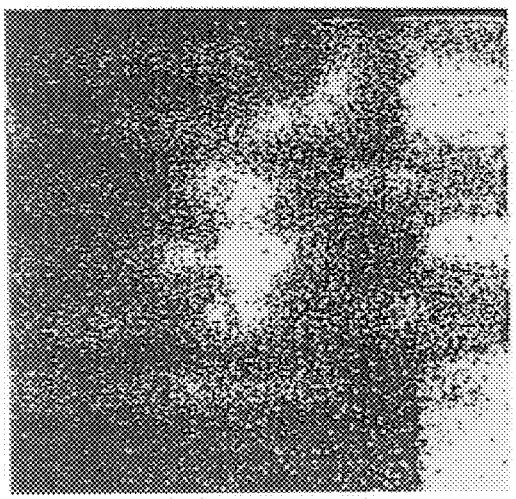
FIG. 3a shows an out of focus image obtained according to the present invention.
Figure 3B:
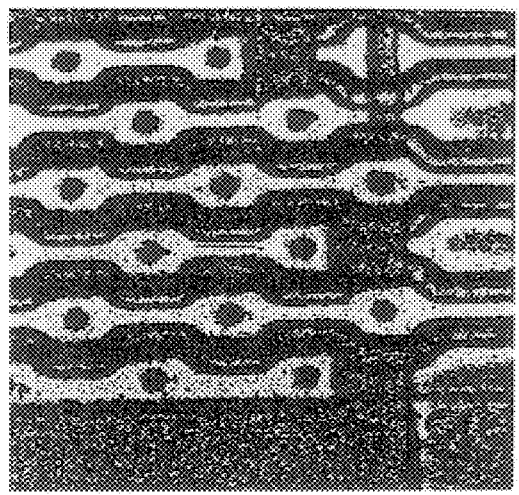
FIG. 3b shows an enhanced image obtained according to the present invention.

Referring to FIGS. 4a to 4f which show aspects of the present invention, the invention solves the problems associated with the known arrangements by obtaining an out of god, focus image by deliberately defocusing the microscope by a few micrometers. The out of focus image is then subtracted from the in focus image to obtain an enhanced image, leaving only the higher frequency components. In particular, the out of focus image exhibits all the same aberrations as in the focus image, including all of the deficiencies listed above, and not just the defects of the focal plane array. FIG. 3a shows an out-of focus image derived by this technique from the sample image of FIG. 2a. Accordingly subtraction of the out of focus image from the in focus image removes all of the common aberrations resulting in the high quality image with improved contrast and edge definition shown in FIG. 3b. Depending on how far out of focus it is, the subtraction of the out of focus image from the sample image also differentiates the sample image to some extent providing enhancement of the edge detail. Differentiation occurs when the amount of defocus is small, i.e. towards the minimum value for the appropriate lens. Differentation is desirable in that it enhances edge definition and improves the aesthetic appearance of the image although it can create artefacts and a false illusion of detail. The image subtraction. technique may be carried out using commercial image processing software or a simple compute program as will be well known by the skilled person.

The following table demonstrates the improvements obtained according to the present invention of the flat field and unsharp mask methods in relation to the various aberrations degrading microscope images:

TABLE 1

| Aberration | Flat Field | Unsharp mask | Present Invention |
| --- | --- | --- | --- |
| Pixel to pixel variation | Partial | No | Yes |
| Lens aberrations | No. | Partial compensation | Better compensation |
| Poor illumination | No | Yes | Yes |
| Backside damage | No. | Partial | Better |

An infrared photoemission microscope according to an embodiment of the invention, is described in more detail with reference to FIG. 4a. The sample 12, which is typically either a packaged device or a wafer, is supported on the sample stage 10 comprising, in the first case, a sample holder or, in the second case, the wafer chuck of a probe station. Such probe stations are available commercially and are well known to the skilled person. For wafers, focussing is achieved by moving the microscope body 18. Other samples can be moved on a vertical positioner available commercially and well known to the skilled person, in which case the microscope body 18 can be fixed while the sample 12 is moved into the focus position.

The lens 14 is a microscope objective lens of any appropriate type.

Light from the sample is focussed by the objective lens 14 onto the focal plane array 16. Preferably a focal plane array sensitive to the infrared portion of the electromagnetic spectrum is used but the invention is applicable in principle to any radiation that can be focussed by a lens.

Figure 4A:
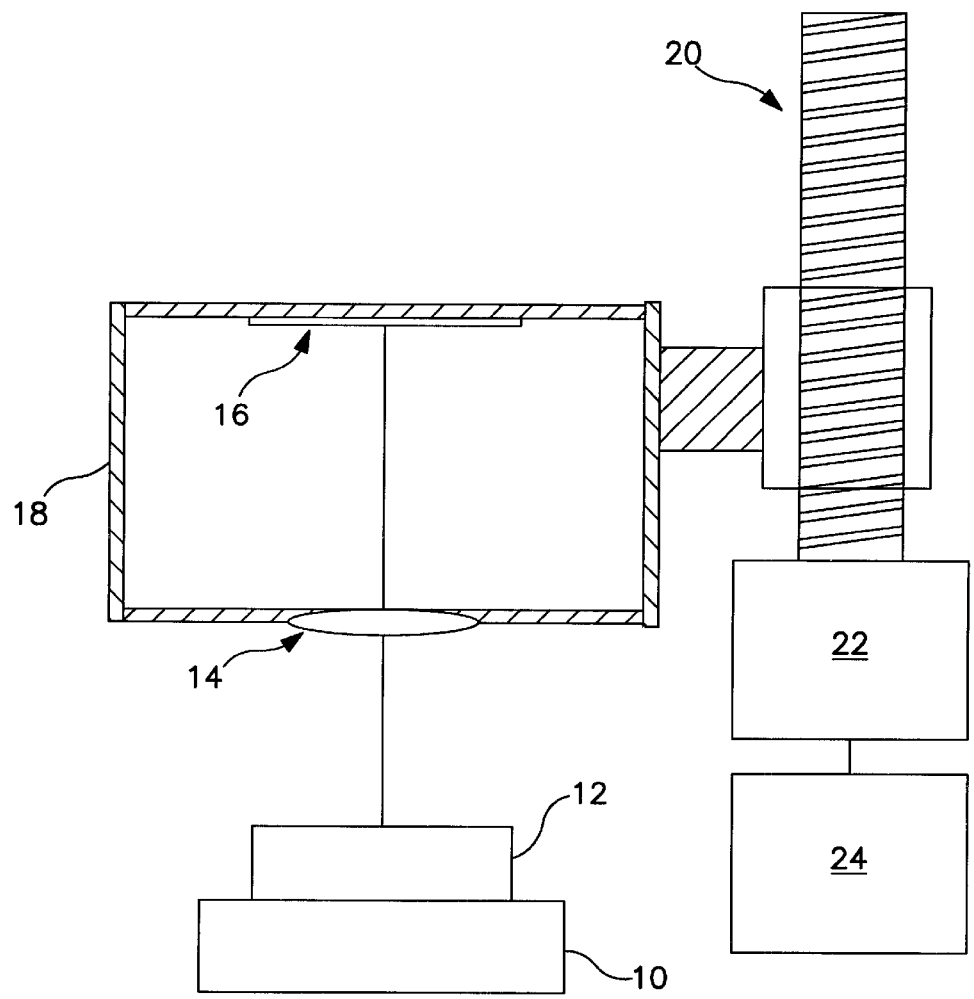
FIG. 4a is a schematic view of a microscope according to the present invention.

In order to focus the microscope, in the first preferred embodiment as shown in FIG. 4a the microscope body 18 is mounted on a precision ball screw assembly 20 of a type commercially available and well known to the skilled person. The ball screw assembly 20 can be driven by a motor 22 controlled from a PC 24. The degree of defocus is user controlled within the range appropriate for the lens in use. The in focus image is obtained, then the PC 24 sends a command to the motor 22 to move the ball screw 20 the appropriate amount before the out of focus image is obtained.

Figure 4B:
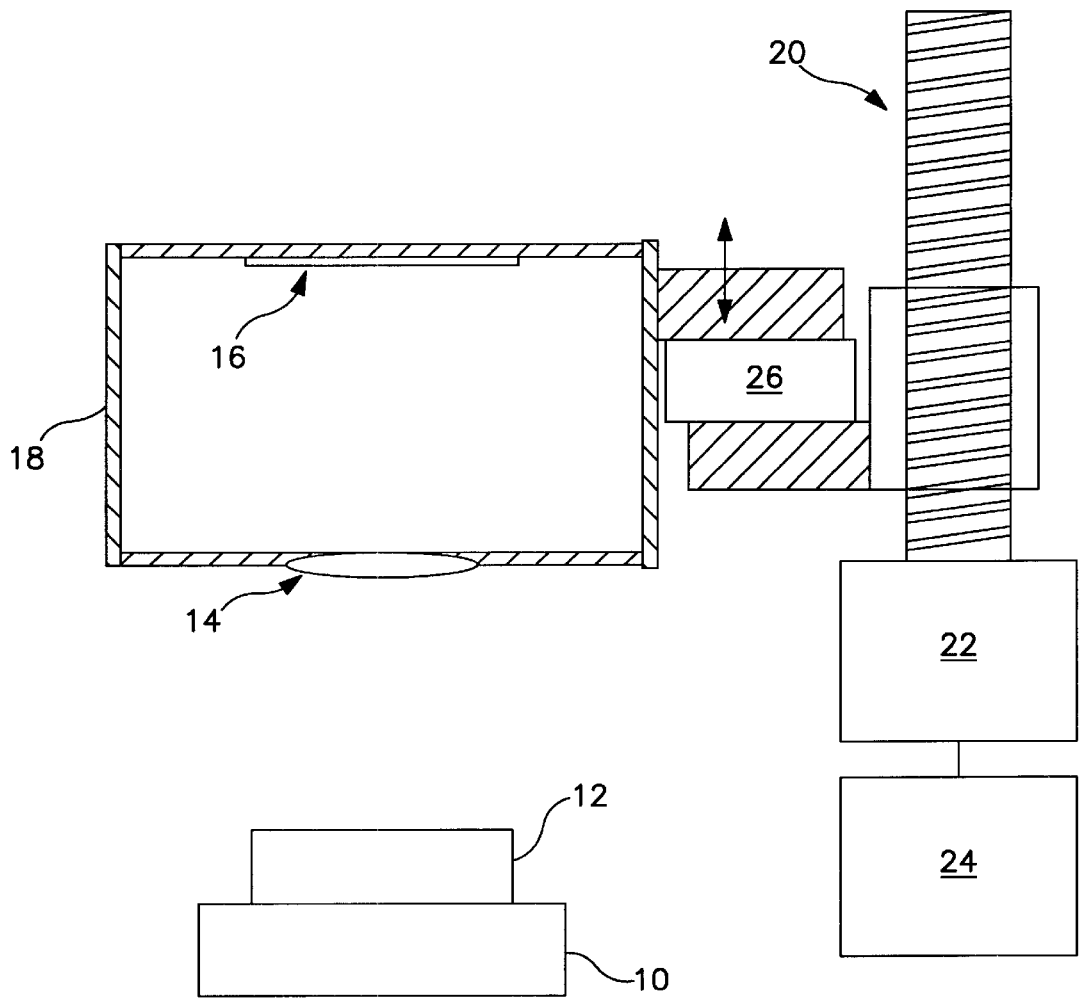
FIG. 4b is a further embodiment of the microscope according to the present invention.

This automatically controlled Z-axis motion control system is one of a number of means by which the position of the microscope body can be adjusted relative to the sample in order to focus or defocus the microscope. Alternative ways in which the microscope can be defocussed in order to achieved the desired results include:

As shown in FIG. 4b an addition fine focus control 26 can be built into the microscope assembly intermediate the ball screw 20 and the microscope body 18. This can comprise either a ball screw positioner or any other appropriate fine movement controller well known to the skilled person and commercially available. The microscope is defocussed by the control 26 to the required amount without requiring additional movement of the ball screw assembly 20.

Figure 4C:
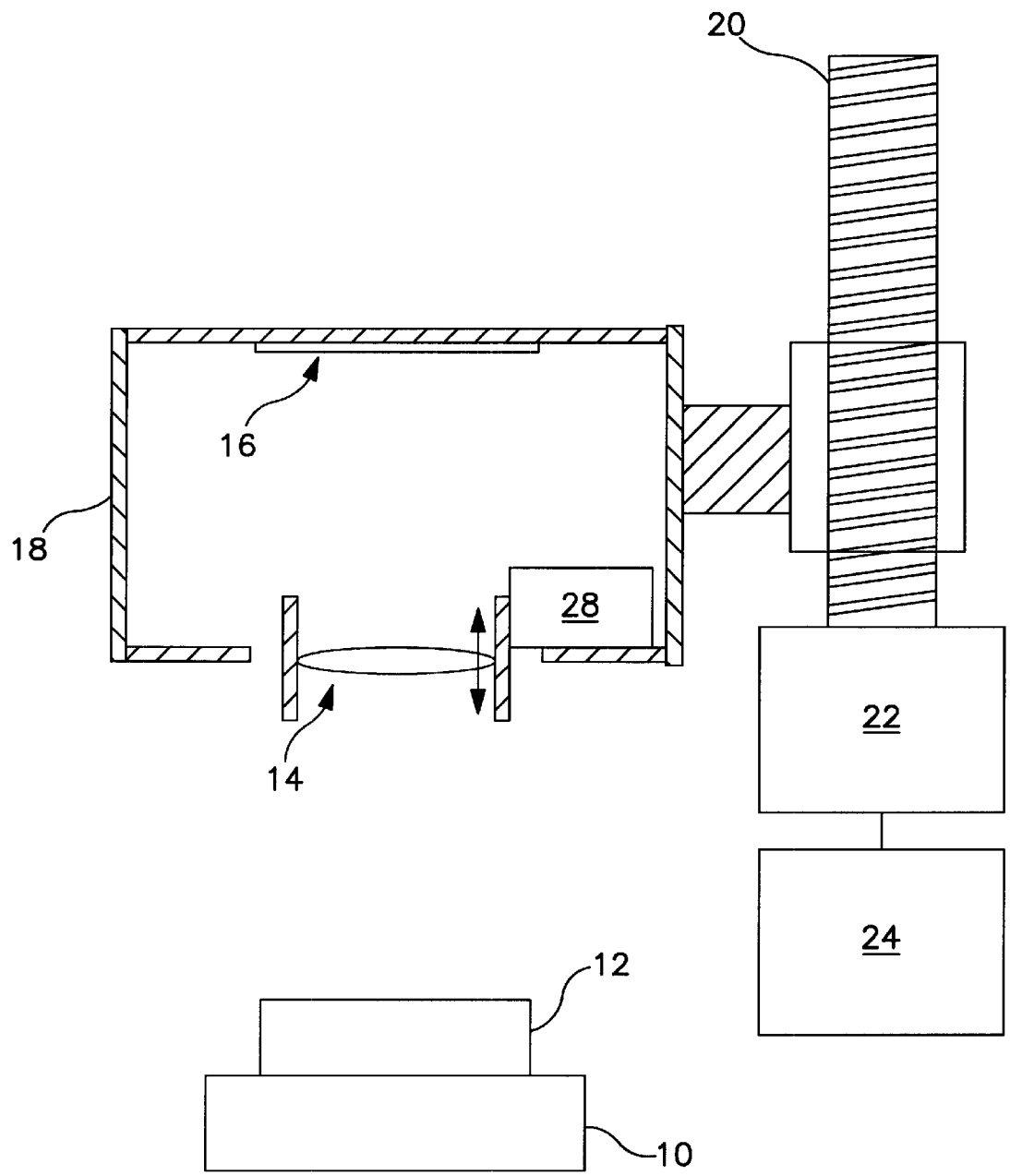
FIG. 4c is a further embodiment of the microscope according to the present invention.

Referring to FIG. 4c a fine focus control 28 is mounted intermediate the lens 14 and the microscope body 18 for moving the lens alone relative to the microscope body. The fine focus control 28 can be of the same type and used in the same manner as the fine focus control 26. It will be appreciated that references to the "lens" could be references to a full lens assembly as appropriate dependent on the requirements of the microscope.

Figure 4D:
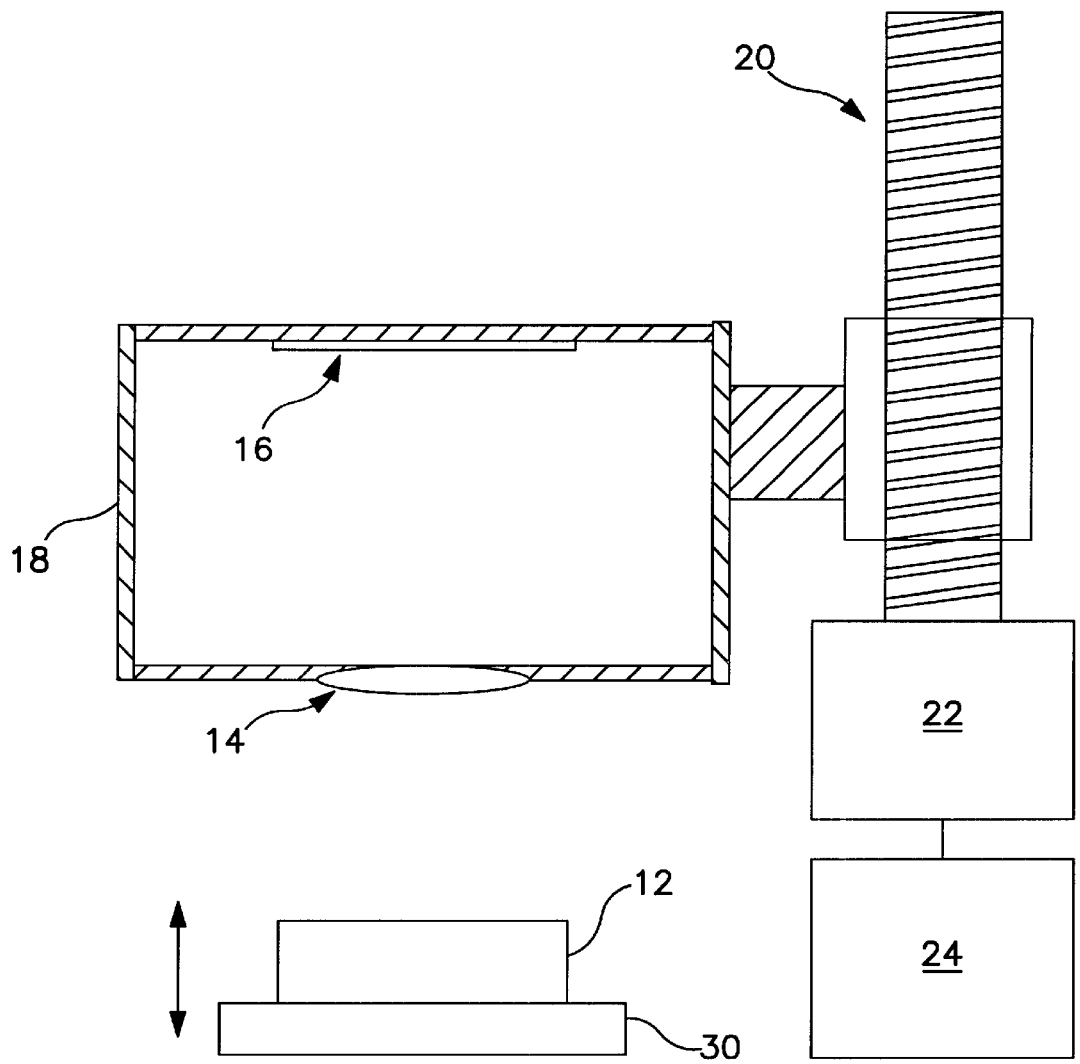
FIG. 4d is a further embodiment of the microscope according to the present invention.

Referring to FIG. 4d, the sample 12 is mounted on a positioner 30 which once again can be of any appropriate type. The sample 12 is then moved on the positioner 30 relative to the microscope body 18 to achieve focussing/defocussing.

Figure 4E:
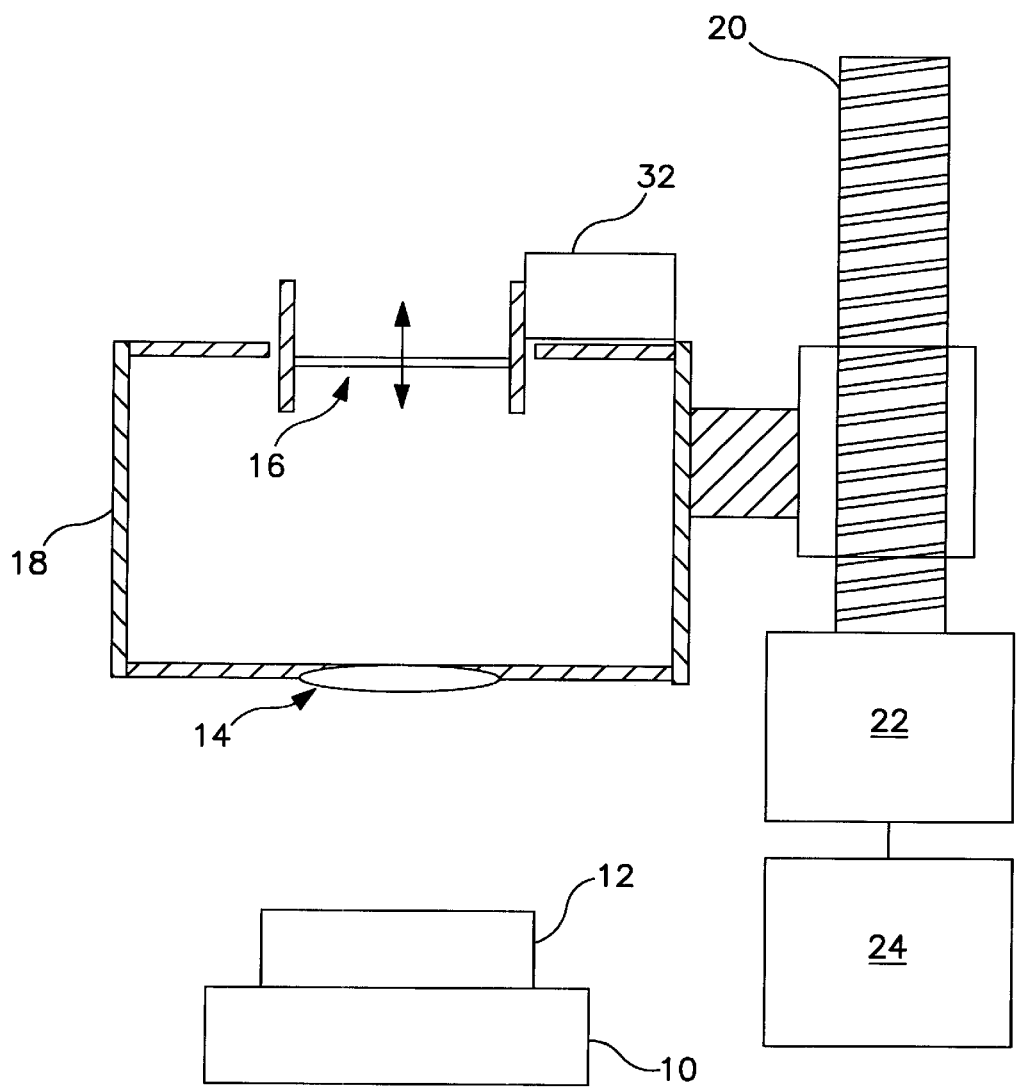
FIG. 4e is a further embodiment of the microscope according to the present invention.

In the arrangement shown in FIG. 4e the focal plane array 16 is mounted via a positioner 32 to the microscope body 18. Accordingly to obtain focussing/defocussing the focal plane array 16 is moved relative to the microscope body. Once again the positioner 32 may be of the same type and used in the same manner as any of the positions/fine focus controls 26,28,30.

Figure 4F:
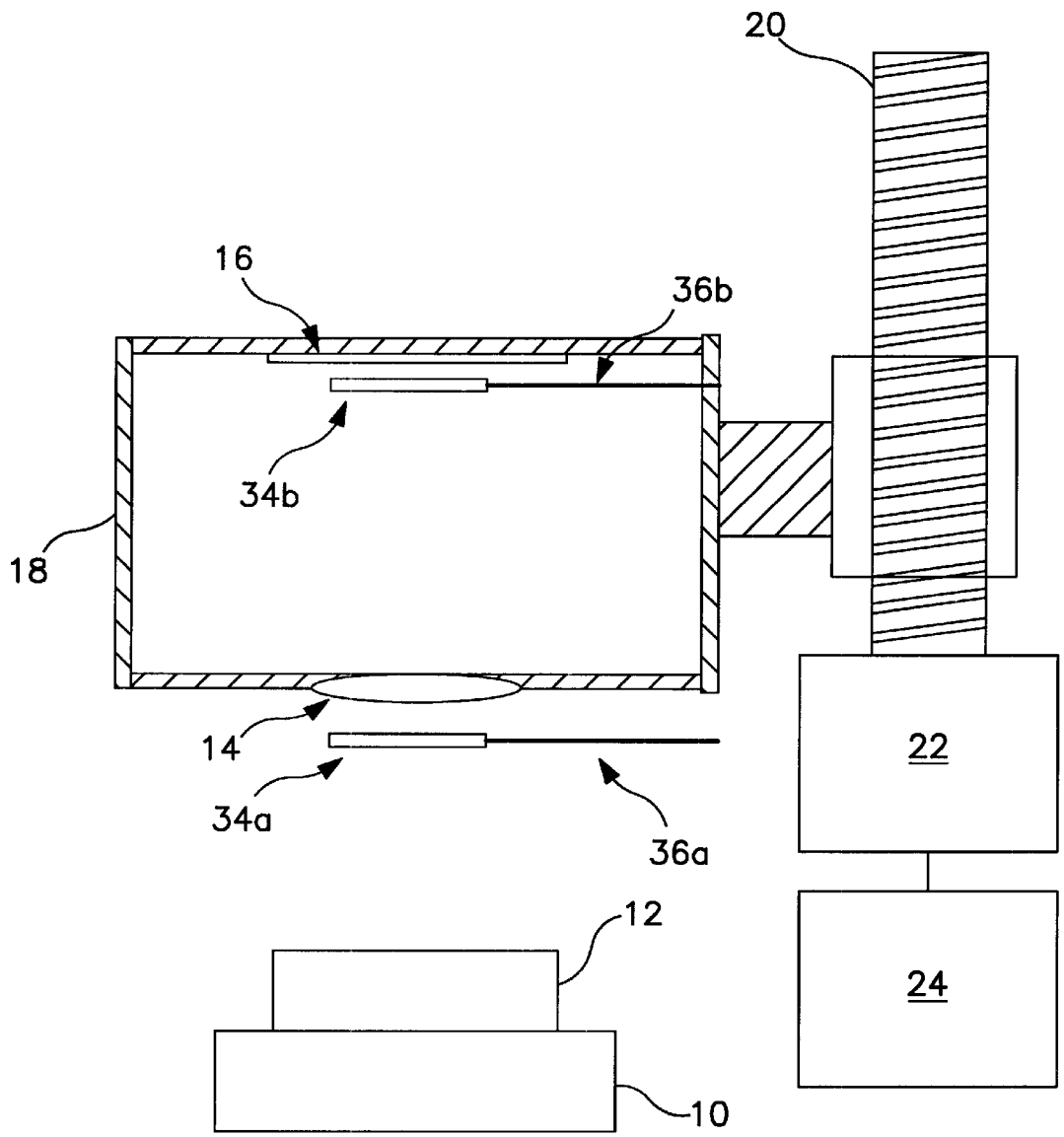
FIG. 4f is a further embodiment of the microscope according to the present invention.

Yet a further alternative arrangement is shown in FIG. 4f. According to this embodiment the microscope body 18, lens 14, focal plane array 16 and sample 12 are all a fixed distance apart save for movement of the ball screw assembly 20. Instead of introducing mechanical movement, a thin transparent plate 34a,34b having a refractive index greater than that of air or the medium in which the microscope is used is interposed between the sample 12 and the focal plane array 16. The plate 34a,34b is preferably mounted on an arm 36a,36b allowing it to be moved in and out of the optical path. As a result the microscope is focussed/defocussed by effectively altering the optical distance between the respective parts. It will be recognised that the transparent plate can be placed at any desired position, for example in either of the positions 34a or 34b and that only a single plate is in fact required. The arm 36a,36b can be driven in any appropriate manner to focus/defocus the microscope and because of the relatively low mass of the transparent plate focussing and defocussing can take place quickly hence enhancing the ability to image in real-time.

It will be appreciated that any appropriate mechanical movement means 20,26,28,30,32 for achieving relative movement under computer control of the whole microscope or the objective lens and the sample is appropriate, for example a lead screw or ball screw. Alternatively the small movement may be achieved by a piezoelectric transducer moving either the whole microscope or just the objective lens relative to the sample.

Since the technique is used for high magnification images, where the technique is of most value, the movement required is only a few micrometers and hence can be accomplished quickly so that the resultant image can be displayed in real time. The amount of defocus required depends on the power and numerical aperture (N.A) of the objective lens as will be well known to the skilled person; typical values are between 1 and 300 $\mu$m.

Figure 5:
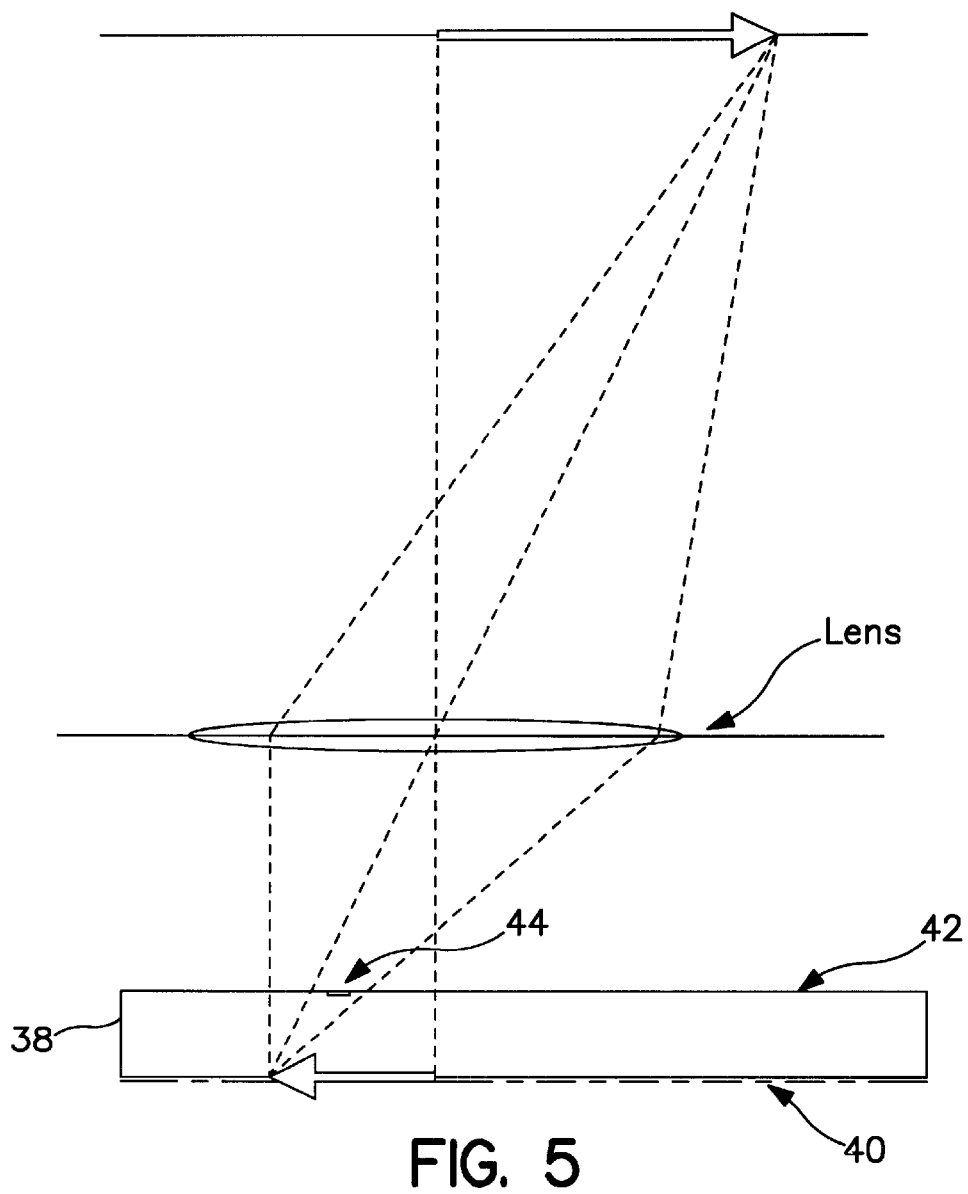
FIG. 5 shows backside imaging in more detail.

FIG. 5 demonstrates the advantages of the invention in relation to backside imaging. According to this technique an integrated circuit 38 is provided having an active front surface 40 to be imaged and facing away from the focal plane array, and a polished back surface 42 facing towards the focal plane array 16. Reflections from the back surface, and out of focus imaging of defects on the back surface such as that shown at 44 can give rise to reduced image quality in the known flat field and unsharp mask systems. In addition the silicon material may be several hundred micrometers thick which can contribute significantly to the lens aberration. As can be seen from Table 1 above, however, the present invention provides improved image quality over the flat field and unsharp mask systems by virtue of the features discussed above.

It will be appreciated that although discussion in the specific description is directed to infrared/photoemission microscopes, the techniques can be applied equally to other suitable microscopes, and in other regions of the electromagnetic spectrum, where aberrations degrade the image. Indeed the principle of the invention is applicable to any imaging instrument in which the image is recorded on a focal plane array. For a telescope or camera, the arrangement shown in FIGS. 4e or 4f for focussing would be required since the distance from object to lens is much greater than lens to focal plane array. In addition the arrangement can be coupled with other appropriate techniques to enhance the image yet further.

Yet further the invention may be used in applications such as infrared satellite earth imaging in which similar focal plane arrays are used and in which atmospheric conditions and weather may degrade the image, night vision systems, either IR or intensified, and microscopy of biological samples in which there is very low contrast.

What is claimed is:

1. An apparatus for image enhancement in a microscope, the apparatus comprising a sample stage, an image detector, image processing means for receiving a detected image from the image detector and processing the detected image, means for focusing an image of the sample onto the image detector, and means for varying the optical path length between the sample stage and the focusing means or between the focussing means and the image detector, between a first configuration at which an in-focus image is received at the image detector and a second configuration at which an out of focus image is received at the image detector, the image processing means being arranged to subtract the out of focus image from the in-focus image to obtain an enhanced image.

2. An apparatus as claimed in claim 1 in which the means for varying the optical path length comprises a planar optical element having a refractive index different from that of the ambient medium, mounted for movement into and out of the optical path between the sample stage and focusing means or between the focussing means and the image detector.

3. A microscope comprising an apparatus as claimed in claim 1.

4. A microscope as claimed in claim 3 comprising one of the group of an infra red or photoemission microscope.

5. An apparatus as claimed in claim 1 in which the means for varying the optical path length comprises movement means for moving at least one of the sample stages, the focussing means and the image detector.

6. An apparatus as claimed in claim 5 in which the movement means is arranged to move at least one of the focussing means and the image detector relative to the sample stage.

7. An apparatus as claimed in claim 5 in which the movement means is arranged to move the sample stage relative to at least one of the focussing means and the image detector.

8. An apparatus as claimed in claim 5 further comprising a main body on which the image detector and focussing means are mounted, the main body being moveable relative to the sample stage for preliminary focussing, wherein the movement means are mounted on the main body for movement of the image detector or focussing means relative to the main body.

9. An apparatus as claimed in claim 5 in which the movement means comprises mechanical movement means.

10. An apparatus as claimed in claim 9 in which the movement means is arranged to move at least one of the focussing means and the image detector relative to the sample stage.

11. An apparatus as claimed in claim 9 in which the movement means is arranged to move the sample stage relative to at least one of the focussing means and the image detector.

12. An apparatus as claimed in claim 5 in which the movement means comprises a piezoelectric transducer.

13. An apparatus as claimed in claim 12 in which the movement means is arranged to move at least one of the focussing means and the image detector relative to the sample stage.

14. An apparatus as claimed in claim 12 in which the movement means is arranged to move the sample stage relative to at least one of the focussing means and the image detector.

15. An apparatus as claimed in any one of claims 1,2,5, 6,7,8,9,10,11,12,13,14 in which the means for varying the optical path length and the image processing means are arranged to obtain an enhanced image in real time.

16. An apparatus as claimed in any one of claims 1,2,5, 6,7,8,9,10,11,12,13,14 in which the means for varying the optical path is computer controlled.

17. A method of enhancing an image in a microscope comprising a sample stage having a sample thereon, focusing means and an image detector, comprising the steps of varying the optical path length between the sample stage and the focusing means or the focusing means and the image detector between configurations in which the sample image is in focus at the image detector and out of focus at the image detector respectively, and subtracting the out of focus image from the in focus image to obtain an enhanced image.

18. A method as claimed in claim 17 in which the enhanced image is obtained in real time.

19. An apparatus for image enhancement comprising an image detector, image processing means for receiving a detected image from the image detector and processing the detected image, means for focussing an image onto the image detector, and means for varying the optical path length between the focussing means and the image detector between a first configuration at which an in focus image is received at the image detector and a second configuration at which an out of focus image is received at the image detector, the image processing means being arranged to subtract the out of focus image from the in focus image to obtain an enhanced image.

20. A method of enhancing an image in an apparatus comprising a focussing means and an image detector, comprising the steps of varying the optical path between the focussing means and the image detector between configurations in which the image is in focus at the image detector and out of focus at the image detector, and subtracting the out of focus image from the in focus image to obtain an enhanced image.

* * * * *